US007980096B2

(12) United States Patent
Bartsch

(10) Patent No.: US 7,980,096 B2
(45) Date of Patent: Jul. 19, 2011

(54) METHOD FOR PREVENTING CONTAMINATION OF AN INNER SURFACE OF A HOLLOW GLASS BODY BY ALKALI COMPOUNDS AND GLASS CONTAINER, ESPECIALLY FOR MEDICINAL PURPOSES

(75) Inventor: Reiner Bartsch, Tirschenreuth (DE)

(73) Assignee: Schott AG, Mainz (DE)

( * ) Notice: Subject to any disclaimer, the term of this patent is extended or adjusted under 35 U.S.C. 154(b) by 1740 days.

(21) Appl. No.: 10/625,582

(22) Filed: Jul. 23, 2003

(65) Prior Publication Data
US 2004/0129026 A1 Jul. 8, 2004

(30) Foreign Application Priority Data

Jul. 24, 2002 (DE) .................................. 102 33 560

(51) Int. Cl.
*C03B 33/06* (2006.01)

(52) U.S. Cl. ................. 65/108; 65/111; 65/112; 65/113; 65/299; 65/300

(58) Field of Classification Search ............ 65/108, 65/87, 105, 70, 81, 295, 299, 300, 4, 60, 65/63–64, 110–113
See application file for complete search history.

(56) References Cited

U.S. PATENT DOCUMENTS

| 3,375,948 | A | * | 4/1968 | Creevy et al. | 215/49 |
| 3,985,535 | A | * | 10/1976 | Bennett et al. | 65/61 |
| 4,010,022 | A | * | 3/1977 | Schul | 65/277 |
| 4,516,998 | A | * | 5/1985 | Ritt et al. | 65/108 |
| 5,171,343 | A | * | 12/1992 | Leber et al. | 65/412 |
| 5,580,365 | A | * | 12/1996 | Maiden | 65/104 |
| 6,536,239 | B1 | * | 3/2003 | Mueller et al. | 65/292 |
| 2004/0176237 | A1 | * | 9/2004 | Ott et al. | 501/66 |

FOREIGN PATENT DOCUMENTS

| DE | 35 21 623 C2 | 6/1987 |
| DE | 100 47 850 A1 | 4/2002 |

OTHER PUBLICATIONS

Heinz G: Schott-Glaslexikon, Landsberg an Lech, MGV-Verlag, 1997.

* cited by examiner

*Primary Examiner* — Queenie Dehghan
(74) *Attorney, Agent, or Firm* — Michael J. Striker

(57) ABSTRACT

In order to avoid deposition of evaporating alkali compounds on an inner surface of a hollow glass body during thermal processing to form a glass container from the hollow glass body, an overpressure is provided in the hollow glass body during the thermal processing. Either rinsing the hollow glass body with a gas, such as air, or at least partially closing the glass body at one end so that sufficiently rapid pressure equilibration is avoided, can provide this overpressure. The glass containers made by these methods are especially suited for food or pharmaceuticals because they have a reduced alkali release from their inner surfaces, for example at most about 2.0 mg/l sodium oxide.

15 Claims, 2 Drawing Sheets

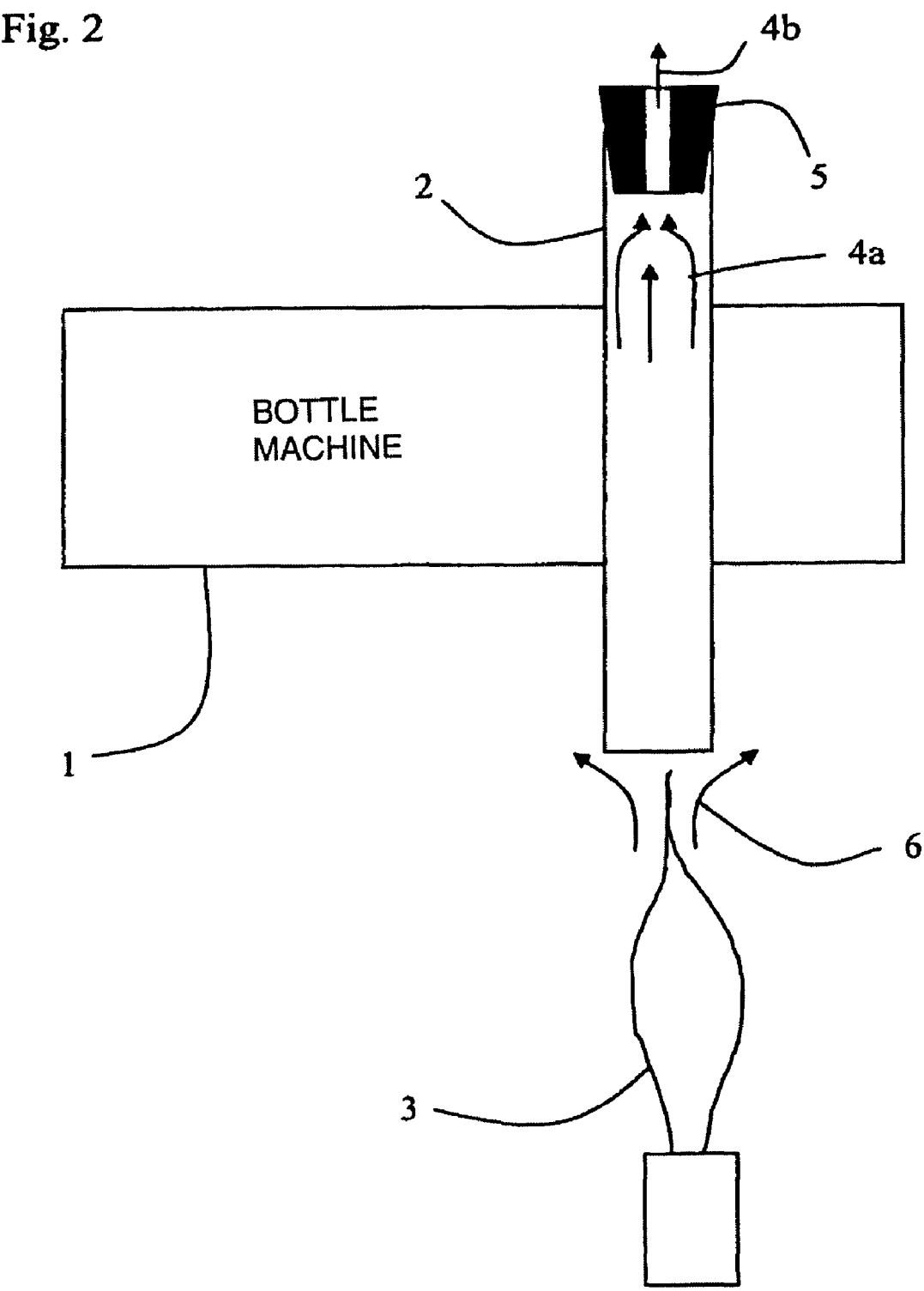

METHOD FOR PREVENTING CONTAMINATION OF AN INNER SURFACE OF A HOLLOW GLASS BODY BY ALKALI COMPOUNDS AND GLASS CONTAINER, ESPECIALLY FOR MEDICINAL PURPOSES

BACKGROUND OF THE INVENTION

1. Field of the Invention

The present invention relates to a method for avoiding or preventing contamination of an interior or inner surface of a hollow glass body with alkali compounds during thermal processing or working. The present invention also relates to a glass container produced by the method, especially to a glass container for medicinal purposes.

2. Description of the Related Art

Alkali compounds, especially alkali borates, evaporate during thermal processing of hollow glass bodies, especially during processing by flames and/or jet flames. These vapors are deposited on the surfaces of the hollow glass body to be processed. This alkali compound layer is a particular problem when containers for food or medicine are made from the hollow glass bodies. The chemical composition of the glass and/or glass surfaces is of great importance for these applications.

Glass tubing is the starting article for manufacture of glass containers for medicinal purposes, such as ampoules, bottles, cartridge ampoules, pens and syringes. Suitable glass tubing is commercially obtainable. The glass tubing is thermally cut to length. The bottoms that are produced in the glass tubing or tubes in this process are opened with heat. The thermal processing steps can be understood in the sense of after-working, since this method amounts to after-working of a finished rigid glass intermediate product for manufacture of the end product, i.e. the glass tube or tubing. Alkali compounds especially evaporate during the thermal opening, and contaminate the interior of the glass tube and thus the container to be made from it.

The shaping of glass gobs into hollow glass bodies by glass blowing methods, in which a glass blower blows air into a hollow glass body, has been known since the beginning of the glass making arts according to Heinz G. Pfaende, in "Schott Glass Dictionary {Schott-Glaslexikon}", Landsberg am Lech, MVG Verlag 1997.

DE 35 21 623 C2 teaches prevention of penetration of fine glass particles into the interior of a hollow soot cylinder produced by a directed glass flow. The required burners are constructed so that the penetrating glass particles are blown from the cylinder interior to the cylinder edge by the glass flow.

A process for cutting a glass tube to length from a continuous glass strand is described in DE 100 47 850 A1. In order to cut the glass strand to length without chips or splinters it is suggested that the desired cutting site should be heated and drawn. Then the glass strand is to be cut through at the desired cutting site. In order to avoid producing a low pressure in the tube during cooling, an air hole is produced in the tube during heating. This should happen at the same time as the cutting through. The hole is burned through by means of a laser, which should be immediately switched off after the hole burning operation, in order to reduce the formation of evaporated products and possible condensation in the tube.

SUMMARY OF THE INVENTION

It is an object of the present invention to provide a method for preventing or avoiding contamination of an inner surface of a hollow glass body by alkali compounds during thermal processing of the hollow glass body.

According to the invention this object is attained by a method of avoiding contamination of an inner surface of a hollow glass body by alkali compounds during thermal processing comprises providing an overpressure in the hollow glass body during thermal processing.

It is a further object of the present invention to provide glass containers, especially for food, medicines and/or pharmaceuticals, having inner surfaces that release less alkali compounds than glass containers of the prior art.

According to the invention this further object is attained by a glass container, especially for medicinal applications, made by a method comprising thermal processing of a hollow glass body, wherein an overpressure is provided in an interior of the hollow glass body during the thermal processing.

In a preferred embodiment of the glass container its inner surface has an alkali release of at most 70 percent of an alkali release from an inner surface of another container made by the same method, except that the overpressure is not provided. For example, preferably the release of sodium oxide from the inner surface is at most 2.0 mg/l sodium oxide.

This further object of the present invention is also alternatively attained by a glass container, especially for medicinal applications, made by a method comprising the steps of:

a) thermally cutting a glass tube to length;
b) thermally opening a bottom formed on the glass tube during the cutting to length; and
c) providing an overpressure in an interior of the glass tube.

In order to attain the desired effect the overpressure must be provided during the thermal processing, since the alkali compounds evaporate during the thermal processing or at the time of the thermal processing. The overpressure provided is such that introduction of possible residual contaminating compounds is prevented.

The overpressure should at least exist locally at the place where the thermal processing takes place in order to prevent introduction of contaminating gases there.

In a preferred embodiment of the method a gas or gas mixture flows through or floods the hollow glass body during thermal processing. When gas flow from the site of the thermal processing takes place an overpressure is produced in this region. Because of that the vapors are not only prevented from reaching the interior of the hollow glass body, but the portion, which are in the interior, are even blown out of it. Preferably air is used as the gas or gas mixture. It has proven advantageous when the flow takes place from the end of the glass body opposite to the end at which the thermal processing takes place.

In an additional preferred embodiment the hollow body is at least partially closed and/or an at least partially closed hollow body is processed. In the event that evaporating alkali compounds can enter the hollow body through an opening formed in the hollow body during thermal processing, the air in the hollow body cannot be completely displaced. An overpressure is formed in the hollow body. Because of that the vapors cannot be introduced into the hollow body.

It has proven to be advantageous to provide a residual opening in the hollow glass body, which acts to balance pressure during or after thermal processing. Because of that too great a pressure wave from the outside, which could arise during thermal processing, so that the hollow glass body is so-to-speak blown out or entirely burst, is prevented. This would interfere with or prevent the subsequent manufacturing steps, so that the required manufacturing tolerances would not be maintained.

The second preferred embodiment is particularly well suited to processing glass tubes, for example in the manufacture of small bottles. Preferably the glass tube is constricted at an end that is not being processed. The constriction should be dimensioned so that pressure balance is possible as already described, however a sufficient overpressure is still guaranteed so that as little alkali compound vapors as possible enter the interior of the glass tube.

Preferably the constriction and the residual opening in the glass tube are made so that the glass tube is closed on the end not being processed by the stopper with the through-going hole.

Glass containers, especially for medicinal purposes, such as ampoules, bottles, cartridge ampoules, pens and injectors, which are made according to the above-described methods, are characterized by inner surfaces that release significantly less alkali than the inner surfaces of conventional containers. The alkali release of the inner surfaces is measured according to ISO 4802-2. Usually the reduction amounts to about 30%. Improvements of about a factor of 3 may be achieved according to the machine adjustments, container size and parameters of the starting product, such as its chemical composition. The container according to the invention has a sodium oxide release of at most about 2.0 mg/l sodium oxide as noted above.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which:

FIG. 2 is a diagrammatic illustration showing a glass tube partially closed by a stopper at one end, which is provided with a through-going hole, so that an air flow upward through the glass tube produces a slight overpressure in it to prevent surface contamination according to the invention.

DETAILED DESCRIPTION OF THE INVENTION

Figure 1:
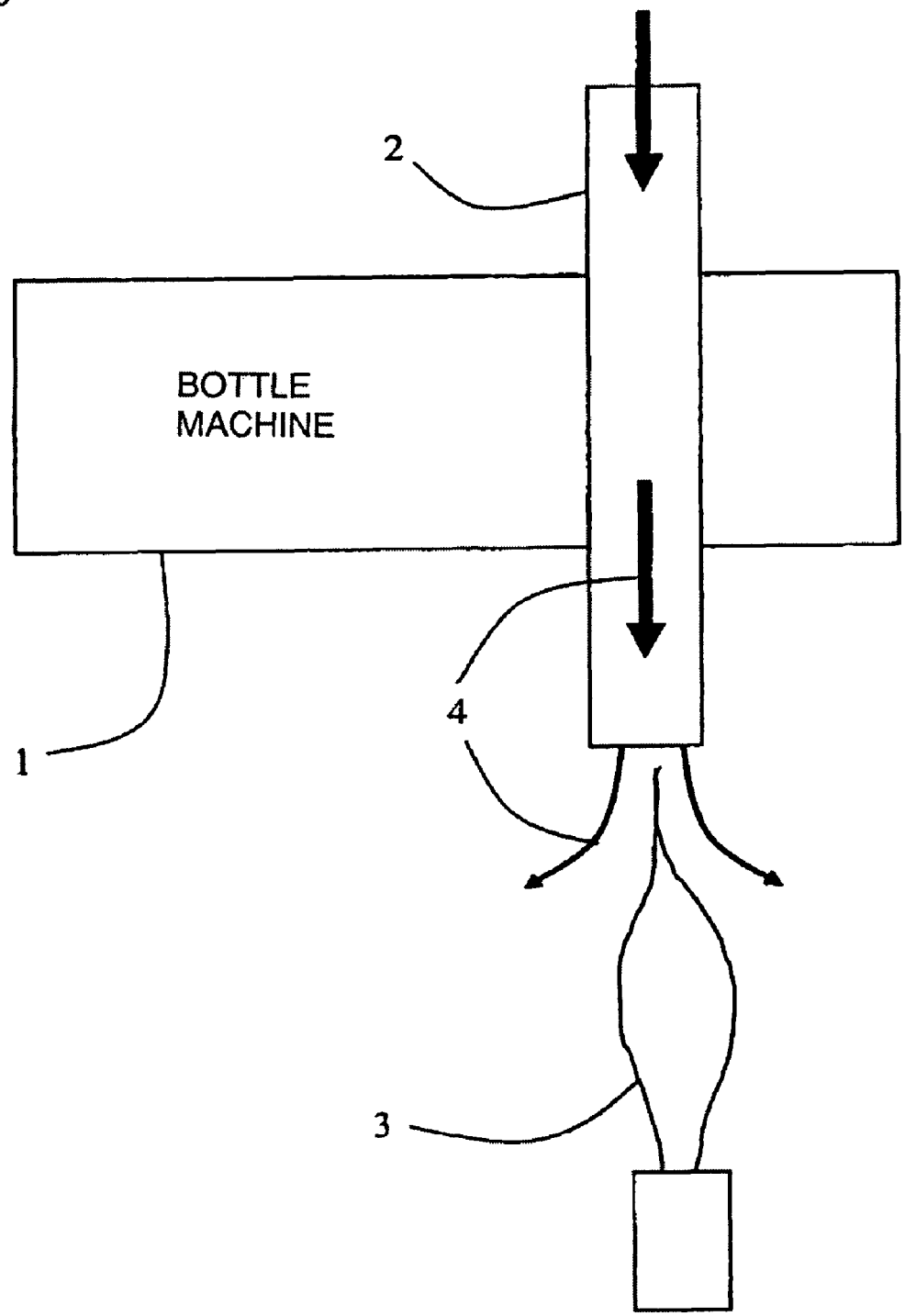
FIG. 1 is a diagrammatic illustration showing a method for reducing contamination of the interior surface of a glass tube used to make a glass bottle.

The manufacture of glass bottles from glass tubes, for example for use as drug containers, occurs predominantly on a carousel machine with a vertical tube configuration during intermittent or continuous processing. A glass tube 2 is shown in FIG. 1, which is clamped in a bottle machine 1 in a vertical position. Next the glass tube 2 is cut through at its lower end, so that two bottoms are formed. The lower bottom is discarded together with the connected tubing piece. The upper bottom is opened by means of the jet flame 3. The mouth of the bottle is then formed at this location. After that the tube 2 is strongly constricted and melted through at a position or height corresponding to the height of the bottle. Because of that respective bottoms arise on the now cut through bottle and the remaining tube 2. The flame 3 of the jet burner opens the bottom on the remaining tube 2 and the above-described method steps are repeated.

Alkali borates, which evaporate and precipitate on the inner surface of the glass tube, are produced by the thermal processing of the glass tube, especially during opening of the remaining tube by means of the jet flame. In the process shown in FIG. 1 blower air 4, which prevents production of a low pressure, is conducted in the glass tube 2, so that vapors entering the interior of the glass tube 2 and/or the vapors already present in it are rinsed out. Because of this blower air contamination of the inner surface of the tube with alkali borates is significantly reduced.

In FIG. 2 a method of reducing the contamination of the glass tube 2 by means of a stopper 5 with a through-going hole is illustrated. In the case of a glass tube 2 with a tube diameter of about 1.6 cm, the stopper 5 has a through-going hole with a diameter of 2.5 mm. During the puncturing process at the opposite end of the glass tube 2 a slight overpressure arises in the glass tube 2 because of this narrowing or constricting of the path for gas flow through the upper end of the glass tube. This overpressure is sufficient so that air 6 heated by the jet flame 3 and thus also the arising alkali borates do not reach the tube inner surface. Because of the stopper 5 the air 6 does not displace a portion 4a of the air found in the tube 2, except for the portion 4b of the air issuing through the narrow through-going hole, which prevents a too high overpressure from building up within the glass tube 2. The too high overpressure would otherwise damage the glass tube 2 and hinder the following processing steps.

A glass tube made from FIOLAX®-clear (product of SCHOTT) is used as the glass tube 2. Its chemical composition is 75 percent by weight $SiO_2$, 10.5 percent by weight $B_2O_3$, 5 percent by weight $Al_2O_3$, 7 percent by weight $Na_2O$, 1.5 percent by weight CaO and <<1 percent by weight BaO. The resulting glass bottle has a sodium borate coating on its inside because of the thermal processing. If one determines the $Na_2O$ release according to ISO 4802-2, the result for the glass bottles made according to the invention is 1.31 mg/l $Na_2O$ on average. For comparison glass bottles made commercially, i.e. without an overpressure were also measured. The $Na_2O$ release from these latter glass bottles is 2.42 mg/l on average. Thus the bottles made according to the invention produce a 54% lower $Na_2O$ release than those obtained commercially.

The disclosure in German Patent Application 102 33 560.5-45 of Jul. 24, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method for avoiding or preventing contamination of an inner surface of a hollow glass body with alkali compounds during thermal processing or working and in a glass container produced by the process, especially to a glass container for medicinal purposes, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A method of making a small glass container, said method comprising the steps of:
    a) clamping a hollow glass tube with an open upper end and an inner surface in a vertical orientation, said hollow glass tube having an alkali release during thermal processing of the hollow glass tube;
    b) thermally cutting said hollow glass tube clamped in said vertical orientation in step a) to length, thereby forming a tube piece for discard and a bottom of said hollow glass tube clamped in said vertical orientation in step a);

c) thermally opening said bottom of said hollow glass tube formed in step b) by heating said bottom; and d) partially closing said open upper end of said hollow glass tube with a stopper provided with a through-going opening, wherein said through-going opening is dimensioned so that an overpressure is produced by constricting a gas flow path through said open upper end during said thermal processing, but so that said open upper end is kept sufficiently open so that an excessive overpressure that would otherwise damage the glass tube is not produced, said thermal processing including said thermally cutting to length and said thermally opening said bottom;

whereby contamination of said inner surface by said alkali release during said thermal processing is at least reduced.

2. The method as defined in claim 1, wherein said alkali release from said inner surface during said thermal processing and said thermal processing takes place by heating with flames and/or with jet flames.

3. The method as defined in claim 1, further comprising forming a container mouth at said bottom of said hollow glass tube and subsequently melting through said hollow glass tube clamped in said vertical orientation at a position corresponding to a height of said small glass container in order to form said small glass container.

4. The method as defined in claim 1, wherein said small glass container is a bottle or an ampoule.

5. A method of making a small glass container, said method comprising the steps of:

a) clamping a hollow glass tube with an open upper end and an inner surface in a vertical orientation, said hollow glass tube having an alkali release during thermal processing of the hollow glass tube;

b) thermally cutting said hollow glass tube clamped in said vertical orientation in step a) to length, thereby forming a tube piece for discard and a bottom of said hollow glass tube clamped in said vertical orientation in step a);

c) thermally opening said bottom of said hollow glass tube formed in step b) by heating said bottom; and d) blowing gas into the hollow glass tube through said open upper end of said hollow glass tube and through the hollow glass tube so that an overpressure is produced during said thermal processing of said hollow glass tube, said thermal processing including said thermally opening said bottom and said thermally cutting to length;

so that contamination of said inner surface of said hollow glass tube by said alkali release during thermal processing is at least reduced.

6. The method as defined in claim 5, wherein said alkali release during said thermal processing and said thermal processing takes place by heating with flames and/or with jet flames.

7. The method as defined in claim 5, further comprising forming a container mouth at said bottom of said hollow glass tube and subsequently melting through said hollow glass tube clamped in said vertical orientation at a position corresponding to a height of said small glass container in order to form said small glass container.

8. The method as defined in claim 5, wherein said small glass container is a bottle or an ampoule.

9. A method of at least reducing contamination of an inner surface of a hollow glass tube by an alkali release during thermal processing, said hollow glass tube having an open upper end and an inner surface, said method comprising the steps of:

a) clamping said hollow glass tube with said open upper end and said inner surface in a vertical orientation, said hollow glass tube having an alkali release during said thermal processing of said hollow glass tube; and b) partially closing said open upper end of said hollow glass tube clamped in said vertical orientation in step a) with a stopper provided with a through-going opening, wherein said through-going opening is dimensioned so that an overpressure is produced by constricting a gas flow path through said open upper end during said thermal processing, but so that said open upper end is kept sufficiently open so that an excessive overpressure that would otherwise damage the glass tube is not produced, said thermal processing including said thermally cutting to length and said thermally opening said bottom;

whereby said contamination of said inner surface of said hollow glass tube by said alkali release during said thermal processing is at least reduced because of said overpressure produced in said hollow glass tube.

10. The method as defined in claim 9, further comprising thermally cutting said hollow glass tube clamped in said vertical orientation to length, thereby forming a tube piece for discard and a bottom of said hollow glass tube clamped in said vertical orientation and then thermally opening said bottom of said hollow glass tube by heating said bottom.

11. A method of at least reducing contamination of an inner surface of a hollow glass tube by alkali compounds evaporating during thermal processing, said hollow glass tube having an open upper end and an inner surface, said method comprising the steps of:

a) clamping said hollow glass tube with said open upper end and said inner surface in a vertical orientation, said hollow glass tube having an alkali release during said thermal processing of said hollow glass tube;

b) thermally cutting said hollow glass tube clamped in said vertical orientation in step a) to length, thereby forming a tube piece for discard and a bottom of said hollow glass tube clamped in said vertical orientation in step a);

c) thermally opening said bottom of said hollow glass tube formed in step b) by heating said bottom; and d) producing an overpressure in said hollow glass tube by blowing gas into the hollow glass tube through said open upper end of said hollow glass tube and through said hollow glass tube during said thermal processing of said hollow glass tube, said thermal processing including said thermally opening said bottom and said thermally cutting to length;

so that contamination of said inner surface of said hollow glass tube by said alkali release during thermal processing is at least reduced because of the overpressure produced in said hollow glass tube during said thermal processing.

12. A method of making a small glass container, said method comprising the steps of:

a) providing a glass tube with an open upper end and an inner surface, said glass tube consisting of glass with a composition, in percent by weight on an oxide basis, of $SiO_2$, 75; $B_2O_3$, 10.5; $Al_2O_3$, 5; $Na_2O$, 7; CaO, 1.5; and BaO, $\ll 1$;

b) clamping said glass tube with said open upper end and said inner surface in a vertical orientation;

c) thermally cutting said glass tube clamped in said vertical orientation in step b) to length, thereby forming a tube piece for discard and a bottom of said glass tube clamped in said vertical orientation in step b);

d) thermally opening said bottom of said glass tube formed in step c) by heating said bottom; and e) partially closing said open upper end of said glass tube with a stopper provided with a through-going opening, wherein said through-going opening is dimensioned so that an overpressure is produced by constricting a gas flow path through said open upper end during thermal processing of said glass tube in which sodium borate evaporates and deposits on said inner surface, but so that said open upper end is kept sufficiently open so that an excessive overpressure that would otherwise damage the glass tube is not produced, said thermal processing including said thermally opening of said bottom and said thermally cutting to length;

whereby contamination of said inner surface by said sodium borate deposited on said inner surface during thermal processing is at least reduced.

13. The method as defined in claim 12, further comprising forming a container mouth at said bottom of said hollow glass tube clamped in said vertical orientation and subsequently melting through said hollow glass tube clamped in said vertical orientation at a position corresponding to a height of said small glass container in order to form said small glass container.

14. A method of making a small glass container, said method comprising the steps of:

a) providing a glass tube with an open upper end and an inner surface, said glass tube consisting of glass with a glass composition, in percent by weight on an oxide basis, of $SiO_2$, 75; $B_2O_3$, 10.5; $Al_2O_3$, 5; $Na_2O$, 7; CaO, 1.5; and BaO, <<1;

b) clamping said glass tube with said open upper end and said inner surface in a vertical orientation;

c) thermally cutting said glass tube clamped in said vertical orientation in step b) to length, thereby forming a tube piece for discard and a bottom of said glass tube clamped in said vertical orientation;

d) thermally opening said bottom of said glass tube formed in step c) by heating said bottom; and e) blowing gas into said glass tube through said open upper end and through said glass tube and through said glass tube so that an overpressure is produced during thermal processing of said glass tube in which sodium borate evaporates and deposits on said inner surface during said thermal processing, said thermal processing including said thermally opening said bottom and said thermally cutting to length;

whereby contamination of said inner surface of said hollow glass tube by depositing of said sodium borate on said inner surface is at least reduced.

15. The method as defined in claim 14, further comprising forming a container mouth at said bottom of said hollow glass tube clamped in said vertical orientation and subsequently melting through said hollow glass tube clamped in said vertical orientation at a position corresponding to a height of said small glass container in order to form said small glass container.

* * * * *